United States Patent
Banerjee et al.

(10) Patent No.: US 8,767,552 B2
(45) Date of Patent: Jul. 1, 2014

(54) WIRELESS COMMUNICATION SYSTEM CONTROLLING TRANSMISSION PARAMETERS OF DATA UNITS ACCORDING TO DATA USEFULNESS

(75) Inventors: Suman Banerjee, Madison, WI (US); Sayandeep Sen, Madison, WI (US)

(73) Assignee: Wisconsin Alumni Research Foundation, Madison, WI (US)

(*) Notice: Subject to any disclaimer, the term of this patent is extended or adjusted under 35 U.S.C. 154(b) by 347 days.

(21) Appl. No.: 12/908,720

(22) Filed: Oct. 20, 2010

(65) Prior Publication Data

US 2011/0176596 A1 Jul. 21, 2011

Related U.S. Application Data

(60) Provisional application No. 61/253,225, filed on Oct. 20, 2009.

(51) Int. Cl.
G01R 31/08 (2006.01)

(52) U.S. Cl.
USPC .......................................................... 370/236

(58) Field of Classification Search
USPC ............... 370/230, 230.1, 232–5, 236, 236.1, 370/236.2
See application file for complete search history.

(56) References Cited

U.S. PATENT DOCUMENTS

| | | | |
|---|---|---|---|
| 8,204,079 B2 * | 6/2012 | Gardner et al. | 370/469 |
| 2001/0019589 A1 * | 9/2001 | Kim et al. | 375/240.27 |
| 2003/0152095 A1 * | 8/2003 | Foore et al. | 370/412 |
| 2004/0027991 A1 * | 2/2004 | Jang et al. | 370/230 |
| 2006/0187836 A1 * | 8/2006 | Frey et al. | 370/235 |
| 2011/0283012 A1 * | 11/2011 | Melnyk et al. | 709/231 |

OTHER PUBLICATIONS

"XORs in the Air: Practical wireless network coding", Katti, et al., SIGCOMM, 2006.*
Chakareski, J., et al., Radio Edge: Rate-Distortion Optimized Proxy-Driven Streaming from the Network Edge, vol. 14 Issue 6, pp. 1302-1312, Dec. 2006, IEEE/ACM Transactions on Networking (TON), IEEE Press, Piscataway, NJ, USA.
Chandra, R., et al., Dircast: A Practical and Efficient Wi-Fi Multicast System, International Conference on Network Protocols (ICNP), 2008, IEEE, Piscataway, NJ, USA.
Cheng, X., et al., Performance Evaluation of Video Streaming in Multihop Wireless Mesh Networks, NOSSDAV '08, Proceedings of the 18th International Workshop on Network and Operating Systems Support for Digital Audio and Video, ACM, New York, NY, USA, 2008.
Chou, P., et al., Rate-Distortion Optimized Streaming of Packetized Media, *Multimedia, IEEE Transactions on*, In Multimedia, IEEE Transactions on, vol. 8, No. 2. (2006), pp. 1-16, IEEE, Piscataway, NJ, USA.
Chou, P., et al., FEC and Pseudoarq for Receiver-Driven Layered Multicast of Audio and Video, Data Compression Conference, 2000, pp. 1-10, Proceedings DCC 2000, IEEE, Piscataway, NJ, USA.

(Continued)

*Primary Examiner* — Mark Rinehart
*Assistant Examiner* — Peter Cheng
(74) *Attorney, Agent, or Firm* — Boyle Fredrickson, S.C.

(57) ABSTRACT

A wireless transmission system identifies priorities of data units and changes at least one of the physical transmission rates of the bits of the data unit, the order of transmission of the data units; and the number of retransmission attempts of the data units based on their individual priorities.

18 Claims, 3 Drawing Sheets

(56) References Cited

OTHER PUBLICATIONS

Feamster, N., Adaptive Delivery of Real-Time Streaming Video, MIT M.Eng. Thesis, 2001, pp. 1-92, Cambridge. MA. USA.

Jakubczak, S., et al, Softcast: One Video to Serve All Wireless Receivers, MIT-CSAIL-TR-2009-005, Feb. 2009, pp. 1-14, MIT, Cambridge, MA, USA.

Majumdar, A., et al., Multicast and Unicast Real-Time Video Streaming Over Wireless LANS, IEEE Transactions on,Circuits and Systems for Video Technology. 2002, pp. 524-534. IEEE. Piscataway. NJ. USA.

Seferoglu, H., et al., Rate Distortion Optimized Joint ARQ-FEC Scheme for Real-Time Wireless Multimedia, .IEEE International Conference on Communications, May 16-20, 2005, pp. 1190-1194 vol. 2, IEEE, Piscataway, NJ, USA.

Seferoglu, H., et al., Rate-Distortion Based Real-Time Wireless Video Streaming, SP:IC(22), No. 6, Jul. 2007, pp. 529-542, Image Communication, Elsevier Science Inc. New York, NY, USA.

Tan, K., et al., Content-Sensitive Video Streaming Over Low Bitrate and Lossy Wireless Network, Multimedia '01 Proceedings of the ninth ACM international conference on Multimedia, ACM New York, NY, USA, Sep./Oct. 2001.

Tan, K., et al., An End-To-End Rate Control Protocol for Multimedia Streaming in Wired-Cum-Wireless Environments, Proceedings of International Symposium on Circuits and Systems, 2003, pp. 512-515, ISCAS '03, May 25-28, 2003, pp. II-836-II-839 vol. 2, IEEE, Piscataway, NJ, USA.

Wang, Y., et al., Error Control and Concealment for Video Communication: a Review. Proceedings of the IEEE, May 1998, vol. 86 Issue: 5, pp. 1-71, IEEE, Piscataway, NJ, USA.

\* cited by examiner

WIRELESS COMMUNICATION SYSTEM CONTROLLING TRANSMISSION PARAMETERS OF DATA UNITS ACCORDING TO DATA USEFULNESS

CROSS REFERENCE TO RELATED CASE

This case claims the benefit of U.S. provisional application 61/253,225 filed Oct. 20, 2009 and hereby incorporated by reference.

STATEMENT REGARDING FEDERALLY SPONSORED RESEARCH OR DEVELOPMENT

This invention was made with United States government support awarded by the following agencies:
NSF 0520152
The United States government has certain rights in this invention.

BACKGROUND OF THE INVENTION

The present invention relates to wireless transmitters and receivers for transmitting and receiving digital data and, in particular, to transceiver systems that control transmitter parameters such as physical transmission bit rate, data byte-order, and retransmission attempts according to designated or imputed usefulness of the data.

Wireless transceivers, used in mobile devices such as cell phones and computers, transmit digital data impressed onto a physical signal such as a radio wave. The parameters of the physical transmission may include, for example, frequency of the radiowave, the modulation system (e.g., quadrature amplitude modulation), the encoding technique (e.g. Grey code), the signal strength, and the physical bit rate of the transmission. Typically, wireless transmitters will change some of the transmission parameters dynamically depending on the channel condition, for example, changing the physical bit rate, according to the amount of interference on the channel as indicated by dropped packets. Communication between the transmitter and receiver help establish these channel conditions.

Communication between a transmitter and receiver are also defined by higher-level protocols that handle problems of interference between transmitters (channel contention), the return of acknowledgment signals, and the retransmission of lost data. Examples of such protocols include, for example, the 802.11 family of wireless standards promulgated by the Institute of Electrical and Electronics Engineers hereby incorporated by reference.

Common wireless channels provide less bandwidth than physical conductors or optical media and for this reason, the transmission of high-bandwidth content such as high quality video can substantially tax common wireless networks. This problem is commonly addressed by compression of the video signal, for example, using the MPEG standards promulgated by ISO/IEC and hereby incorporated by reference. Such compression may process a block of data such as a Group of Pictures (GOP) comprising, for example, frames of a movie. Data reduction is obtained by using data of earlier or later frames to reconstruct other frames, for example, by sharing common portions of the frames that do not change. In this way, the amount of frame data that must be separately transmitted is reduced.

Network coding can be used to reduce the retransmission of data to multiple receivers by combining (coding) multiple data units of retransmitted data to be decoded by receivers using previously received data.

Even with current compression systems and network coding, transmitting high quality video to multiple receivers using wireless network standards can be difficult. Such transmissions to multiple users of the video stream would be desirable, for example, in an educational environment to permit students to follow remote lectures.

SUMMARY OF THE INVENTION

The present invention provides improved transmission of video or other signals where relative usefulness of transmitted data units can be individually established. In one embodiment, the usefulness of each data unit is used to provide dynamic fine-grained control of the transmitter parameters for the data unit, for example, changing bit rate of the transmission of the data unit with respect to other data units within a communication flow. This adjustment increases the aggregate value of the received data to the application within fixed bandwidth constraints.

The present invention can be distinguished from so-called unequal error protection (UPE) systems in which additional, redundant data units are assigned to useful data thus substantially increasing the data's transmission footprint. In one embodiment, the present invention improves the usefulness of transmitted data without the need for this data redundancy.

The present invention can also be distinguished from systems that designate an entire communication flow with a fixed priority level (giving every data unit within the flow an equal priority value) for example used in the DiffServ techniques or the 802.11(e) standard. In one embodiment, the present invention provides variations in transmission parameters on a data unit-by-data unit basis, and dynamically at times proximate to the time of transmission of the data unit. Further, unlike priority systems, the usefulness value of the present invention provides both an ordering and a quantitative difference in usefulness between data units permitting gradated adjustment of the transmission parameters for different data units.

Generally, but not always, the physical transmission parameters are what would be considered MAC-layer transmission parameters and may include: ordering, transmission power, transmission bit rate, selection of transmission sub-carrier according to noise immunity, transmission bandwidth and transmission order.

This technique may be used in either a broadcast (multicast) or a non-broadcast (unicast) application. Together these techniques substantially increase the ability of a standard wireless network to provide high quality video or similar data.

Specifically, the present invention provides a wireless system wherein physical transmission parameters of transmission power, transmission bit rate, and transmission bandwidth are assigned based on usefulness of data. A transmitter controller receives data units for transmission and evaluates a time varying usefulness of the data units in vis-a-vis conveying the overall information of a communication flow of multiple data units. The transmitter controller provides each data unit to the transmitter for transmission together with physical transmission parameters for the data unit based on the usefulness of the data unit. In this way, the physical transmission parameters of the data units may change within a single communication flow.

It is thus a feature of at least one embodiment of the invention to exploit differences in the underlying "value" of different data units to the receivers to enhance the final value of the communication flow to one or more receivers.

The physical transmission parameters may further include at least one of: a number of retransmission attempts and a transmission order.

It is thus a feature of at least one embodiment of the invention to provide other methods of exploiting identified or imputed usefulness of individual data units beyond changing bit rate, power or bandwidth of the transmission.

The physical transmission rate provided to the transmitter may be based on a functional combination of a base rate selected for a group of data units and a physical transmission rate tailored to the given data unit within the group of data units. The transmitter may receive client reception reports providing an indication of errors in received data units and the base rate is determined from the client reception reports.

It is thus a feature of at least one embodiment of the invention to provide a system that may also accommodate dynamic changes in channel capacity that suggests changes in the bandwidth of the transmission.

The transmitter or receiver may record the physical transmission rate for each given data unit and wherein the base rate is determined from a determination of error rate as a function of physical transmission rate deduced from the client reception report and the recorded physical transmission rate for each given data unit.

It is thus a feature of at least one embodiment of the invention to use the variability of physical transmission rate in the present invention to provide a detailed understanding of the trade-offs between physical transmission rate and data errors for controlling the base rate.

The transmitter may employ a pseudo broadcast protocol in which a single receiver receiving the transmitted data units provides an acknowledgment data unit used to manage channel contention against other transmitters, and other receivers receiving the transmitted data units do not provide an acknowledgment data unit.

It is thus a feature of at least one embodiment of the invention to minimize the transmission overhead in a broadcast environment.

The transmitter may receive client reception reports providing an indication of errors in received data units and the base rate may be determined from the client reception reports and the client reception reports may be received less frequently than the acknowledgment data unit.

It is thus a feature of at least one embodiment of the invention to provide a dynamic understanding of channel conditions in a broadcast environment.

The data units may be a stream of compressed data in which the decompression of data units are dependent on a number of other data units and usefulness may be established at least in part by how many data units depend on a given data unit for decompression.

It is thus a feature of at least one embodiment of the invention to provide a usefulness system particularly useful for data such as video transmissions.

The usefulness may be determined at least in part by how many receivers are receiving the data unit.

It is thus a feature of at least one embodiment of the invention to provide another method of assessing the value of a data unit being transmitted.

The transmission scheduler may schedule data units in available slots in accordance of their usefulness and adjust physical transmission rate of data units to accommodate this ordering.

It is thus a feature of at least one embodiment of the invention to provide a simple method of scheduling data units for transmission that provides both an ordering and bit rate reflecting data unit usefulness.

Various features of the invention are set forth in the above description, following claims and the attached documents. It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

DETAILED DESCRIPTION OF THE PREFERRED EMBODIMENT

Figure 1:
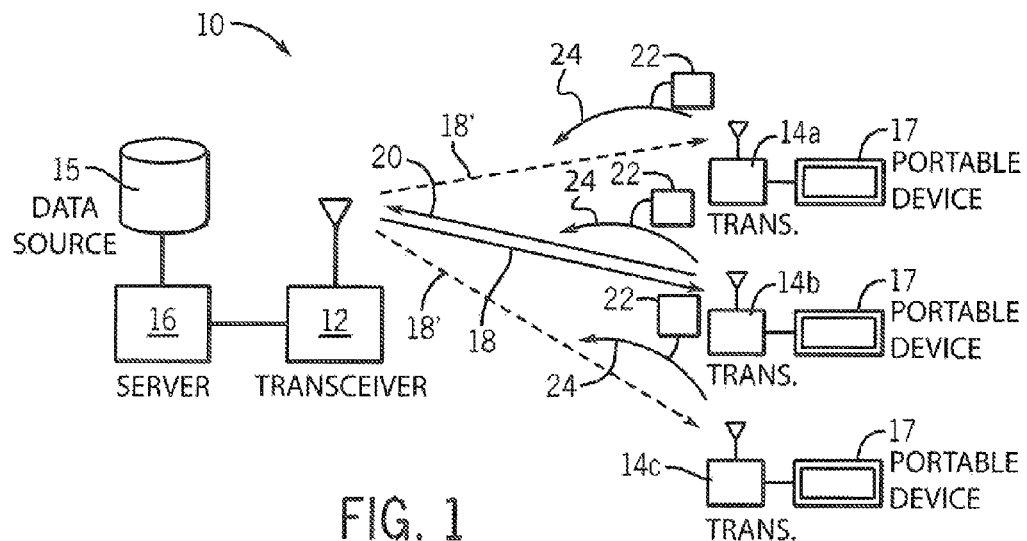
FIG. 1 is a simplified diagram of a wireless communication system providing a pseudo-broadcast from a transmitter to multiple receivers, one receiver which returns an acknowledgment signal and the others of which return client reception reports.

Referring now to FIG. 1, a wireless system 10 may include, for example, a transceiver 12 communicating with one or more remote transceivers 14a-c. The transceivers 12 and 14 may be compatible generally with the 802 wireless standard.

The transceiver 12 may provide for the capabilities of a standard wireless access point and may provide an internal processor executing a stored program as understood in the art. The transceivers 14 may, for example, be attached to portable devices 17 such as portable computers (e.g. laptops or tablet computers) smart phone or the like providing variously displays, keypads, touchscreens and the like as well as a processor that may be programmed by means of a stored program to communicate with the transceivers 12 to implement additional protocol steps as will be described below.

The transceiver 12 may communicate with a server 16, the latter receiving data from a data source 15, for example, a storage unit, live video camera or the like. The data will be typically transmitted in a communication flow consisting of multiple data units (for example packets) linked by their conveyance of common information between a given source and destination.

In a broadcast system, the transmitter uses a group broadcast address as the destination identifier that corresponds to the multiple receivers of the data, while in a unicast system, the transmitter uses the specific identifier of the receiver as the destination identifier.

When the invention is used for broadcasting, a pseudo-broadcast approach may also be employed in which one specific identifier of one of the receivers is used as the destination identifier for the data unit. This approach ensures that this specific receiver will decode this data unit, while other remaining receivers simply eavesdrop on this transmission to decode the same data unit. In systems, such as the 802.11 family of wireless networks, this approach ensures that the receiver indicated as the primary receiver will send back an explicit acknowledgment signal to indicate successful reception of the data unit When the present invention is used for broadcasting data, for example, to stream video data to the multiple portable devices 17, a pseudo-broadcast may be implemented using 802.11 unicast mode in a manner analogous to a technique described by S. Katti, H. Rahul, W. Hu, D. Katabi, M. Medard, and J. Crowcroft in "Xors in the Air: Practical Wireless Network Coding", ACM SIGCOMM 2006, Pisa, Italy, September 2006. In this procedure transceiver 12 provides unicast transmissions 18 to an arbitrarily chosen transceiver (14b) which provides MAC-layer acknowledgment signals 20 in return. These acknowledgment signals 20 are used to adjust the back-off parameters for the transmission, indicating a delay period before a retransmission in the case of channel contention per the 802.11 standard.

The remaining transceivers (14a-14c) eavesdrop (as indicated by dotted lines 18') on unicast transmission 18 and periodically provide client reception reports 22 by transmissions 24 occurring at a much slower rate than the acknowledgment signals 20. For example, the client reception reports 22 may be transmitted only once for every 100 acknowledgment signals. It will be understood, therefore, that the overhead of the client reception reports 22 may be moderated to much less than that required for standard acknowledgment signals. As will be discussed below, each client reception report 22 details particular data units that have been lost during the previous unicast transmissions 18.

Figure 2:
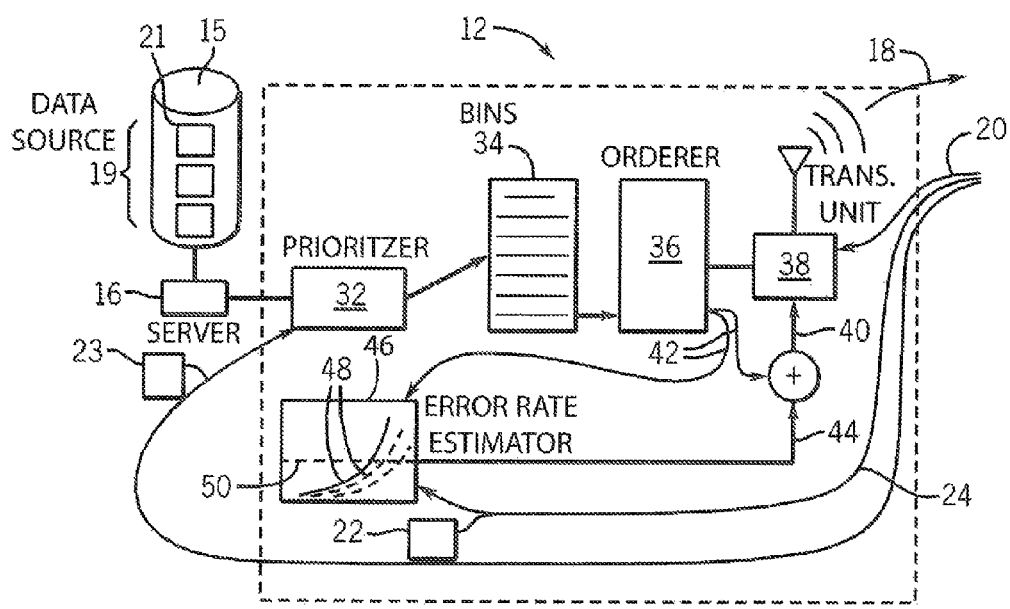
FIG. 2 is a block diagram of the transmitter of FIG. 1 showing a scheduler responsive to the received client reception reports.

Referring now to FIG. 2, transceiver 12 provides numerous functional blocks that may be implemented through combinations of hardware and software as understood in the art and as will be described below. The transceiver 12 may receive data units 21 to be transmitted at a prioritizer 32 which collects a given set 19 of data units 21 (for example a group of pictures) together with data units 23 to be retransmitted (as will be discussed below) and sorts these data units 21 and 23 into a usefulness order. This may be done, for example, by placing each data unit 21 or 23 into data usefulness bins 34 according to usefulness. As depicted in this example, highest usefulness data units 21 or 23 will be at the lowest bins of the usefulness bins 34 and lowest usefulness data units 21 or 23 will be at the highest bins of the usefulness bins 34.

The usefulness of each data unit 21 or 23 may be attached to the data received by an external device or maybe imputed by the prioritizer 32. In one embodiment, the present invention considers three different factors related to usefulness. Those factors include: (1) dependency among data units 21 or 23 for the purposes of decoding (to be discussed below), (2) transmission deadline for the data unit 21 or 23, and (3) the number of transceivers 14 receiving the data unit 21 or 23. Other metrics of usefulness can also be used to indicate the value of the individual data unit within the communication flow in communicating the information of the communication flow. The usefulness value provides both a relative usefulness of the data units allowing the data units be ranked as greater than, less than or equal to other data units in usefulness, but also an absolute usefulness of the data units so that relative differences between the usefulness of data units can be quantitatively evaluated. Generally, data units 21 or 23 that have a greater number of other data units 21 or 23 depending on them for decoding are given higher usefulness (X) than data units 21 or 23 having a lesser number of data units 21 or 23 depending on them. In one embodiment, X may be simply the number of dependent data units.

Similarly, data units closer to their transmission deadline are given higher usefulness than data units further from their transmission deadline. In one embodiment, this usefulness may be expressed by a delay time (D) generally inversely related to usefulness (that is the shorter the delay time the higher the usefulness).

Likewise data units received by more users (transceivers 14) are given higher usefulness (C) than data units received by fewer users. In one embodiment, C may be a linear function of the number of intended recipients.

These values may be simply combined after normalization, for example, by the simple expression:

$$\text{Usefulness} = \overline{X} \times \frac{\overline{C}}{\overline{D}}$$

where the bars over the variable values indicate normalization to a common scale. Clearly other usefulness systems may be used.

As noted above, in one important embodiment, the transmitted data unit 21 may be MPEG or similarly encoded video. The data units 21 or 23 may each comprise multiple bits, for example, a byte of eight bits of data. In the MPEG encoding system, the usefulness of the data units 21 or 23 may reflect a category of the video data according to whether the data is from an I-frame, a P-frame or a B-frame in a group of pictures (GOP) in MPEG encoding. As is generally understood in the art, an I-frame may be decoded in isolation whereas a P-frame and B-frame are dependent on data from other frames for complete decoding. Each of these different frames may be associated with a numeric value proportional to the number of other frames they require for successful decoding. I-frames need only their own data for successful decoding and hence may have the highest usefulness. B-frames have the greatest dependencies and thus have the least usefulness. It should be noted that the dependencies are considered with respect to data that has actually been transmitted and that these dependencies will therefore change over time. Thus this determination of usefulness is dynamic and the usefulness of a particular frame of data will drop if frames that are dependent on this given frame are, for example, lost or not transmitted.

The deadline for a video data unit may be readily calculated, for example, using the formula:

$$\text{Deadline} = \frac{Frame_{seq-no}}{FrameRate} + Playbackbuffersize + \delta$$

where:

FrameRate is the video frame rate, for example, 30 frames per second;

$Frame_{seq-no}$ is the frame location within the sequence;

Playbackbuffersize is the size of the video buffer at the receiver in seconds (indicating additional delay that can be tolerated; and δ is a small constant to account for initial frame delay.

Deadlines for other types of streamed or sequential data may also be identified using a similar methodology.

The number of receivers may be identified from the client reception report 22 or other similar techniques.

The prioritized data units 21 or 23 are then provided to an orderer 36 that will adjust the order of transmission and assign other transmission parameters, for example, of the physical bit rate, transmission power, or transmission channel bandwidth for each data unit 21 or 23. The transmission parameters may be scaled according to the usefulness value. This process of ordering the data units 21 or 23 will be described below. The orderer 36 provides the order to data units 21 or 23 for transmission to a physical transmitter unit 38 which also receives bit rate commands 40 at a physical transmission parameter control input and provides transmission of the received data units 21 or 23 at the bit rate provided by the bit rate commands 40 for the particular data units 21 or 23. The physical transmission parameter control input may in alternative embodiments receive commands defining the transmission power, subcarrier and/or channel bandwidth to use for the data unit.

The bit rate commands 40 for a given data unit being transmitted may be a combination of a data unit specific bit rate 42 from the orderer 36 combined with a base bit rate 44 provided by a error rate estimator 46.

Referring still to FIG. 2, the error rate estimator 46 collects a set of error rate functions 48 describing the relationship between a bit rate (determined from the bit rate commands 40) and data unit errors measured by the transceivers 14 as extracted from their client reception reports 22. Specifically, each client reception report 22 provides a list of data units 21 or 23 which were received with bit errors. The client reception report 22 is combined with a record of the bit rate commands 40 for those data units 21 or 23 as they were transmitted permitting the construction of an error rate function 48 for each particular transceiver 14. As will be understood from the previous description, the variation in bit rate commands 40 for different data units 21 or 23 allows this table to be readily constructed from actual measured data for most bit rates. Missing bit rates may be developed by standard interpolation and extrapolation techniques.

Using the error rate functions 48 and a predetermined acceptable error rate threshold 50, the error rate estimator 46 outputs the base bit rate 44 calculated to be the highest rate such that the expected error probability for all transceivers 14 would be below the error rate threshold 50. This error rate threshold 50 is usually set to a conservatively low value to provide reasonable assurance of reliable transmission. The determined base bit rate 44 is preferably subject to an exponentially weighted moving average so that it does not react to short-term fades of the channel.

Figure 3:
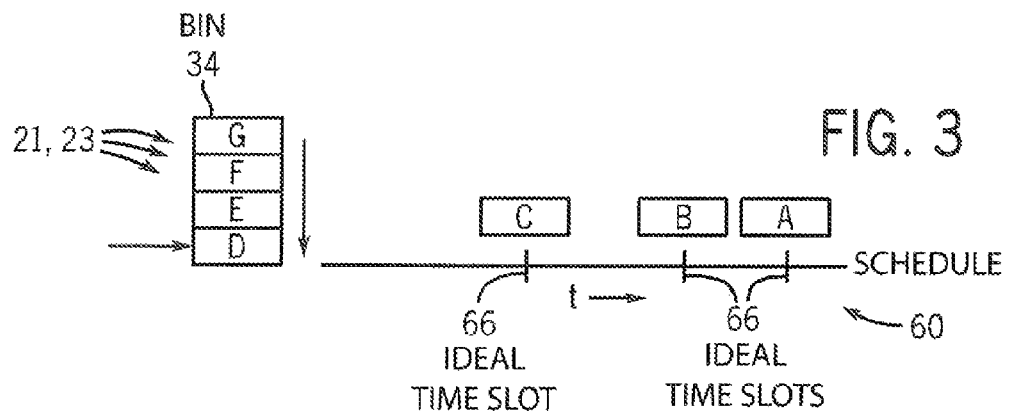
FIG. 3 is a simplified representation of the operation of the scheduler of FIG. 2 at a first stage of a scheduling operations in which data units may be scheduled at their ideal transmission time.
Figure 4:
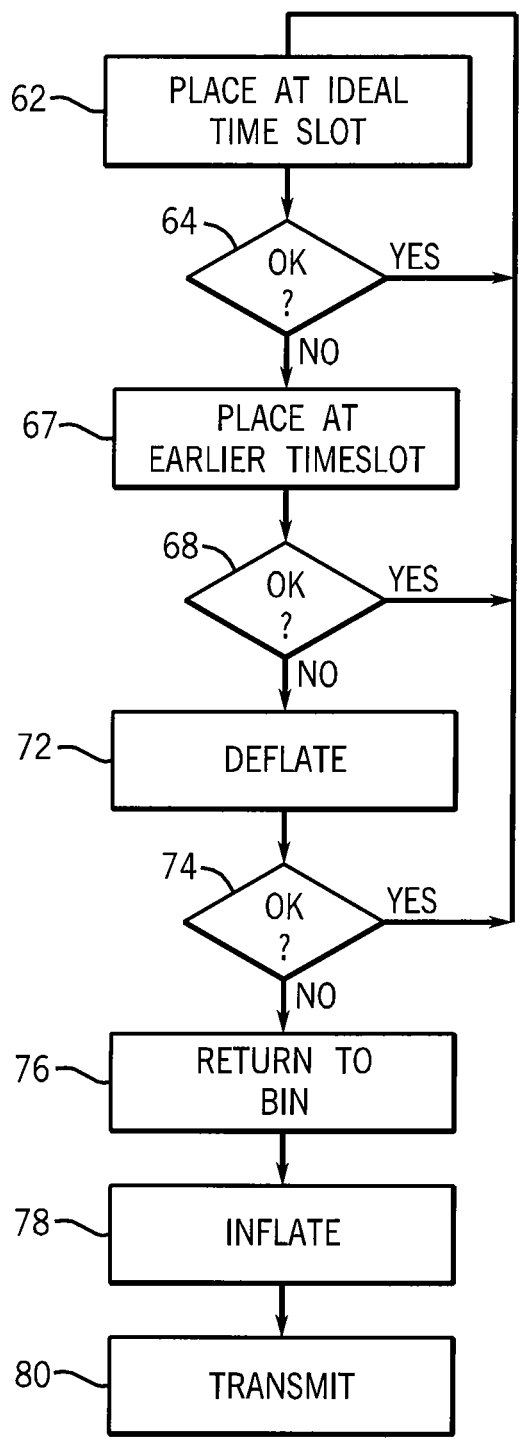
FIG. 4 is a flow chart of the steps executed by the scheduler in this process.

Referring now to FIGS. 3 and 4, the operation of the orderer 36 will now be described with respect to a bin 34 initially containing seven data units A-G ranked in order of usefulness with data unit A having the highest usefulness. The width of each data unit 21 or 26 in this diagram signifies the time required to send the data unit at the base bit rate 44. Wider widths, accordingly, have slower bit rates and take longer to transmit but provide lower error rates as is generally understood.

The orderer 36, starting with the highest usefulness data units A-G first tries to place each data unit at its ideal time slot in a schedule 60 per process block 62. The ideal time slot is a time before the Deadline calculated above and is a time by which the data unit needs to be transmitted so that it may be retransmitted multiple times in the event of error after an expected client reception report 22 reporting that error. The ideal time slot is considered with respect to the slowest and most error prone transceiver 14.

As shown in FIG. 3, three data units A-C have been placed at their ideal time slots 66. As indicated by decision block 64 so long as each data unit may be placed at its ideal time slot 66, the technique of process block 62 is repeated.

Figure 5:
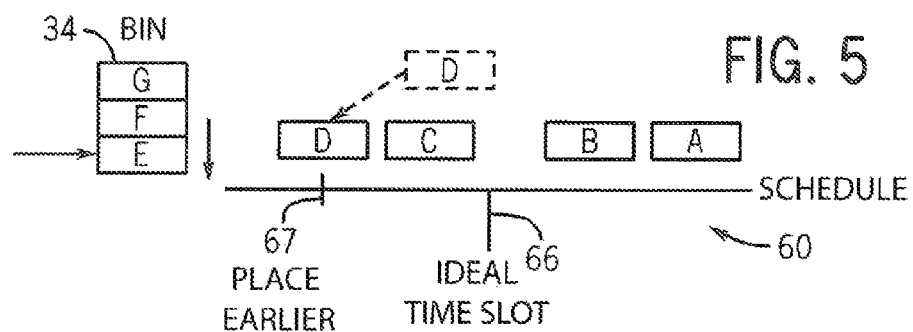
FIG. 5 is a figure similar to that of FIG. 3 showing a later stage in the scheduling process where a data unit cannot be scheduled at its ideal transmission time but is scheduled earlier.

Referring now to FIGS. 5 and 4, if a data unit (e.g. D) cannot be placed at its ideal time slot 66 (indicated by block D represented by dotted lines), the program proceeds to process block 67 to place the data unit D in a earlier time slot. In these situations, it can be assumed that the ideal time slot 66 for the data unit D is occupied by a higher-valued data unit (i.e. C) because of the ordering of data units by the prioritizer 32 in the bin 34. Note by considering the data units in order of their usefulness, only the current data unit (D) needs to be moved in order to ensure that lower usefulness data units are moved in favor of higher usefulness data units.

If process block 67 is successful as determined by process block 68, the next data unit is evaluated once again by process block 62.

Figure 6:
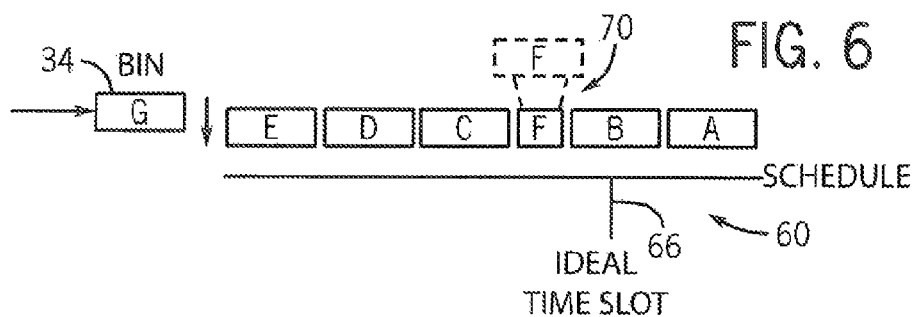
FIG. 6 is a figure similar to that of FIGS. 3 and 5 showing yet a later stage in the scheduling process where a data unit cannot be scheduled at its ideal time and must be deflated to be inserted into the schedule.

Referring now to FIG. 6, it may not be possible to place a data unit (F) earlier in time, for example, because of a lack of open spaces in the schedule 60 earlier in time. This extent of the schedule 60 to earlier times is typically limited by the imminence of actual transmission times which cannot be preceded. In such cases, there may be open spaces that are insufficiently wide to accommodate the transmission of data unit F at its base bit rate 44 (indicated by dotted lines). In this case the data unit F is moved to the largest opening 70 before its ideal time slot 66 and then deflated as indicated by process block 72 to fit within the opening 70. Deflation simply involves designating the particular data unit F to have a higher bit rate 42 and thus higher bit rate commands 40 decreasing its transmission time and therefore shrinking its width as depicted.

If at decision block 74, if this deflation process is successful, the orderer 36 returns again to process block 62.

Figure 7:
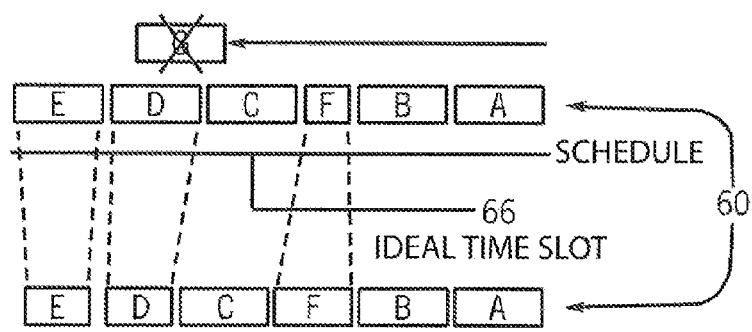
FIG. 7 is a figure similar to that of FIGS. 3, 5, and 6 showing a data unit that cannot be scheduled in the available positions and showing a deflation/inflation of the scheduled data units according to relative usefulness

Referring now to FIG. 7, if at decision block 74, the deflation process does not allow for the adding in of the data unit (for example as shown by data block G) into open space within the schedule 60 before its ideal time slot 66, that data block (G) is not scheduled per process block 76 in the current iteration but is returned to the bin 34 to be scheduled if possible in a later iteration of these process blocks.

At the conclusion of the scheduling indicated by the inability to schedule another data unit per decision block 74, a re-inflation process is undertaken as indicated by process block 78. The purpose of this re-inflation process is to share the deflation burden better among data units. Inflation is carried out by going to the list of active transceivers 14 and calculating the expected loss of video quality they would suffer if the data units were sent out according to the current schedule 60 including the deflation. This can be done by using the error rate functions 48 developed earlier as applied to the priorities to determine an effective value of the potential communication. This process of process block 78 endeavors to decrease the bit rate of those data units most critical to quality of reception and to compensate this by deflating other data units which would minimally decrease the quality of the video. In this way the total transmission time is unaffected and bandwidth of the communication channel is not assumed to increase. As illustrated, data unit F is deemed a valuable data unit for a transceiver 14 with poor channel quality and hence its rate is reduced while the rate of transmissions of data units D and E are increased as compensation, these data units contributing relatively less to video quality.

Once the order of transmission has been determined the data is transmitted immediately per process block 80 to provide even more opportunities for retransmitting data units before the deadline expires. As noted above, a consequence of this technique is that the data units get sent at a variety of different rates resulting from the inflation and deflation process, providing improved data for the construction of error rate functions 48. The transmission bit rate may be substituted or augmented with control of the transmitter to change the transmission power, subcarrier, or transmission bandwidth for the data unit according to the usefulness of the data unit.

It will be understood that the present invention may use network coding in the retransmission of some units to improve efficiency. Generally this process attempts to identify a set of data units that need retransmission such that each receiver needing a data unit for retransmission from the set has correctly received all other data units of the set needing transmission. These data units of the set can be transmitted in "exclusive or" (XOR) combinations or by using other data coding techniques. For example, if two receivers A and B each need one of data units 1 and 2, the XOR of data unit 1 and 2 can be transmitted (essentially halving the number of data units that need to be transmitted) and the receivers can decode the necessary data needed from the XOR combination with the previous correctly received data unit. That is, receiver A can take previously received data unit 1 and process it with 1 XOR 2 to extract data unit 2.

It will be appreciated from the above description that retransmitted data is mixed in with data that has not yet been transmitted in the above ordering process. As a result the relative usefulness of these two types of data will be directly compared to each other and to the extent that the usefulness of retransmissions decreases relative to other data, the number of retransmissions of data will essentially be limited according to its usefulness.

While the present invention provides substantial benefits for a multicast transmission, it will be appreciated that the modification of the transmitting parameters according to the usefulness of the data units is also applicable to unicast transmissions where these techniques improve data throughput in a given channel.

Certain terminology is used herein for purposes of reference only, and thus is not intended to be limiting. The terms "first", "second", "high", "low" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

The term "data unit" refers to a multiple bit unit of binary data, for example, a bite, word or double word, as defined by the application and should not be limited to a particular number of bits. References to "a controller" and "a processor" can be understood to include one or more controllers or processors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network. Processors may provide for standard computer architectures or may be implemented through a variety of electronic circuits including field programmable gate arrays and the like.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

Various features of the invention are set forth in the following claims. It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What we claim is:

1. A wireless system comprising:
a transmitter for wirelessly transmitting data units according to physical transmission parameters including transmission bit rate, wherein the physical transmission parameters have values associated with different error rates in transmitting the data units using the physical transmission parameters;
a transmitter controller receiving data units for transmission and evaluating a time varying usefulness of the data units in conveying information of a communication flow of multiple data units, the transmitter controller providing each data unit to the transmitter for transmission together with associated physical transmission parameters for the data unit based on the usefulness of the data unit, wherein data units having higher usefulness are associated with physical transmission parameters having lower error rates, and data units having lower usefulness are associated with physical transmission parameters having higher error rates;

whereby the physical transmission parameters of the data units changes within a communication flow;

wherein the physical transmission parameter provided to the transmitter is based on a functional combination of a base rate selected for a group of data units and a physical transmission parameter independent to a data trait within the communication flow and wherein the transmitter further receives client reception reports providing an indication of errors in received data units and wherein the base rate for each data unit is adjusted based on the client reception reports.

2. The wireless transmitter system of claim 1 wherein the physical transmission parameters further include at least one of number of retransmission attempts and transmission order.

3. The wireless transmitter system of claim 1 wherein the transmitter records the physical transmission parameter for each given data unit and wherein the base rate is determined from a determination of error rate as a function of physical transmission parameter deduced from the client reception report and the recorded physical transmission parameter for each data unit.

4. The wireless transmitter system of claim 1 wherein the transmitter employs a pseudo broadcast protocol in which a single receiver receiving transmitted data units provides an acknowledgment data unit used to manage channel contention versus other transmitters and other receivers receiving the transmitted data units do not provide an acknowledgment data unit.

5. The wireless transmitter system of claim 4 wherein the transmitter further receives client reception reports providing an indication of errors in received data units and wherein the physical transmission parameter for each data unit is determined in part from the client reception reports and wherein the client reception reports are received less frequently than the acknowledgment data unit.

6. The wireless transmitter system of claim 1 wherein the data units are a stream of compressed data in which a decompression of data units are dependent on a number of other data units and wherein usefulness is established at least in part by how many data units dependent on a given data unit for decompression have been successfully transmitted.

7. The wireless transmitter system of claim 1 wherein usefulness is determined at least in part by how many receivers are receiving the data unit at any given time.

8. The wireless transmitter system of claim 1 wherein the transmission scheduler schedules an order of the data units in available positions according to usefulness determined by values selected from the group consisting of number of dependencies on other data units, number of receivers, and transmission deadline, and adjusts the physical transmission parameter transmission bit rate of at least one data unit up to accommodate this ordering.

9. The wireless transmitter system of claim 8 wherein the transmission scheduler adjusts the physical transmission parameter transmission bit rate of at least one data unit down based on video quality.

10. A method of wirelessly transmitting data units of multiple bits from a transmitter to a receiver, the data units having dynamically determined usefulness of the data units in conveying information of a communication flow of multiple data units, the method comprising a computer executing the steps of changing a physical transmission parameter including transmission bit rate of a given data unit according to a relative and absolute usefulness of the given data unit with respect to other contemporaneous data units of different usefulness, wherein the physical transmission parameters have values associated with different error rates in transmitting the data units using the physical transmission parameters, and wherein data units having higher usefulness are associated with physical transmission parameters having lower error rates, and data units having lower usefulness are associated with physical transmission parameters having higher error rates;

the method further including the steps of:

(a) monitoring data errors in transmitted data units to determine a base transmission rate selected for a group of data units and modifying the base transmission rate as a function of usefulness of given data units in the group of data units; and (b) transmitting from the receiver to the transmitter client reception reports providing an indication of errors in received data units and wherein the base rate for each data unit is determined from the client reception reports.

11. The method of claim 10 wherein the transmitter records the physical transmission parameter for each given data unit and wherein the base rate is determined from a determination of error rate as a function of physical transmission parameter deduced from the client reception report and the recorded physical transmission rates for each given data unit.

12. The method of claim 10 wherein the transmission of the data units employs a pseudo broadcast protocol in which a single receiver receiving transmitted data units provides an acknowledgment data unit used to manage channel contention versus other transmitters and other receivers receiving the transmitted data units do not provide an acknowledgment data unit, but utilize the contents of the packet nonetheless.

13. The method of claim 12 further including the step of transmitting from a receiver to a transmitter client reception reports providing an indication of errors in received data units and wherein the physical transmission parameter for each data unit is determined in part from the client reception reports and wherein the client reception reports are received less frequently than the acknowledgment data unit.

14. The method of claim 10 wherein the data units are a stream of compressed data in which a decompression of data units are dependent on a number of other data units and wherein usefulness is established at least in part by how many data units depend on a given data unit for decompression.

15. The method of claim 10 wherein usefulness is determined at least in part by how many receivers are receiving the data unit.

16. The method of claim 10 wherein the transmission scheduler schedules an order of the data units in available positions according to usefulness determined by values selected from the group consisting of number of dependencies on other data units, number of receivers, and transmission deadline, and adjusts the physical transmission parameter of at least one data units up to accommodate this ordering.

17. The method of claim 16 wherein the transmission scheduler adjusts the physical transmission parameter transmission bit rate of at least one data unit down based on video quality.

18. The method of claim 10 wherein the data units are compressed video data and I-frame data units are given a higher usefulness than P-frame and B-frame data units.

* * * * *